Oct. 3, 1972  M. D. MINTZ  3,695,842

METHOD AND SYSTEM FOR ANALYZING A LIQUID

Filed March 12, 1970  5 Sheets-Sheet 1

INVENTOR
MICHAEL D. MINTZ
BY
Maleson, Kimmelman & Ratner
ATTORNEYS.

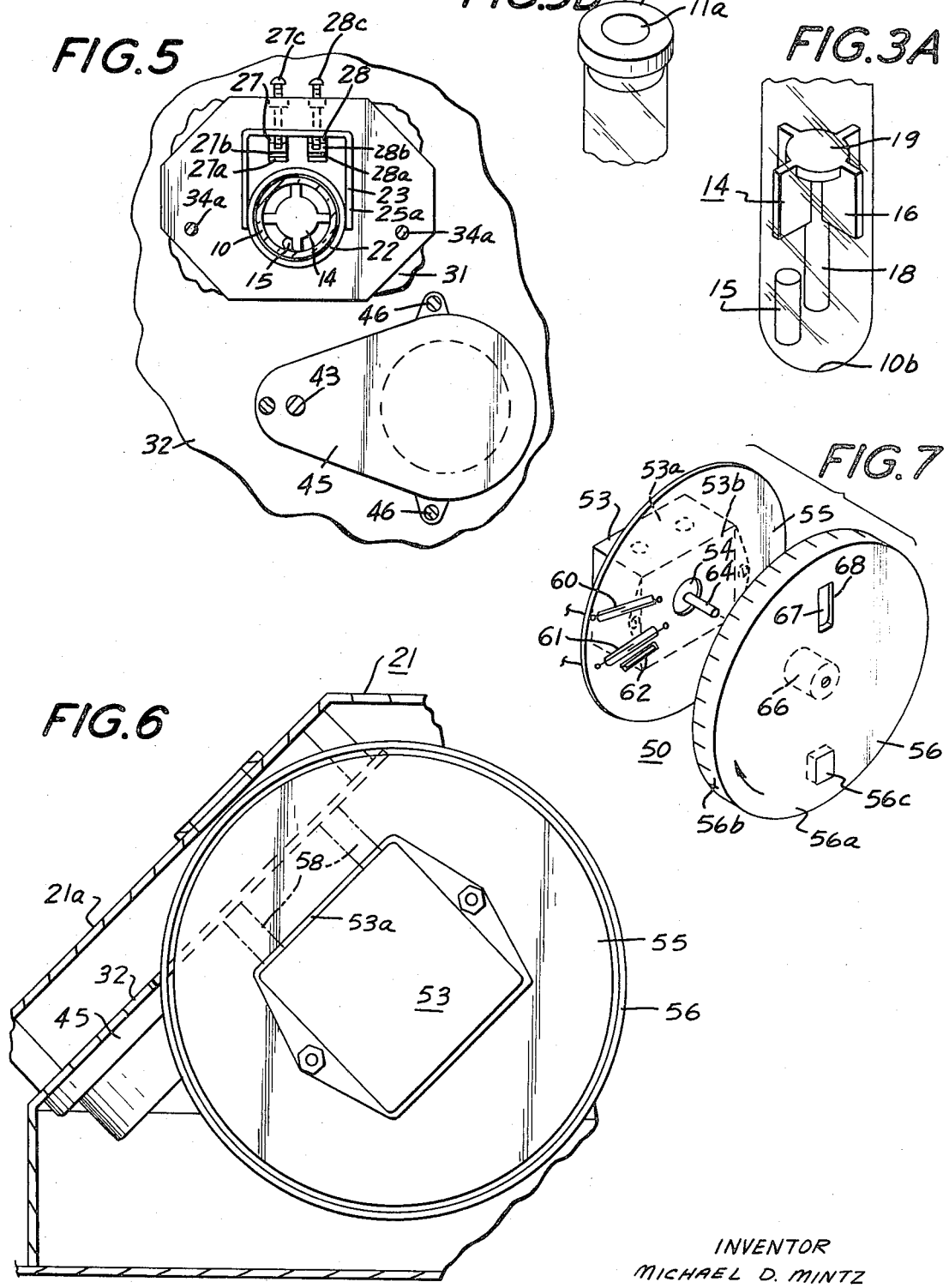

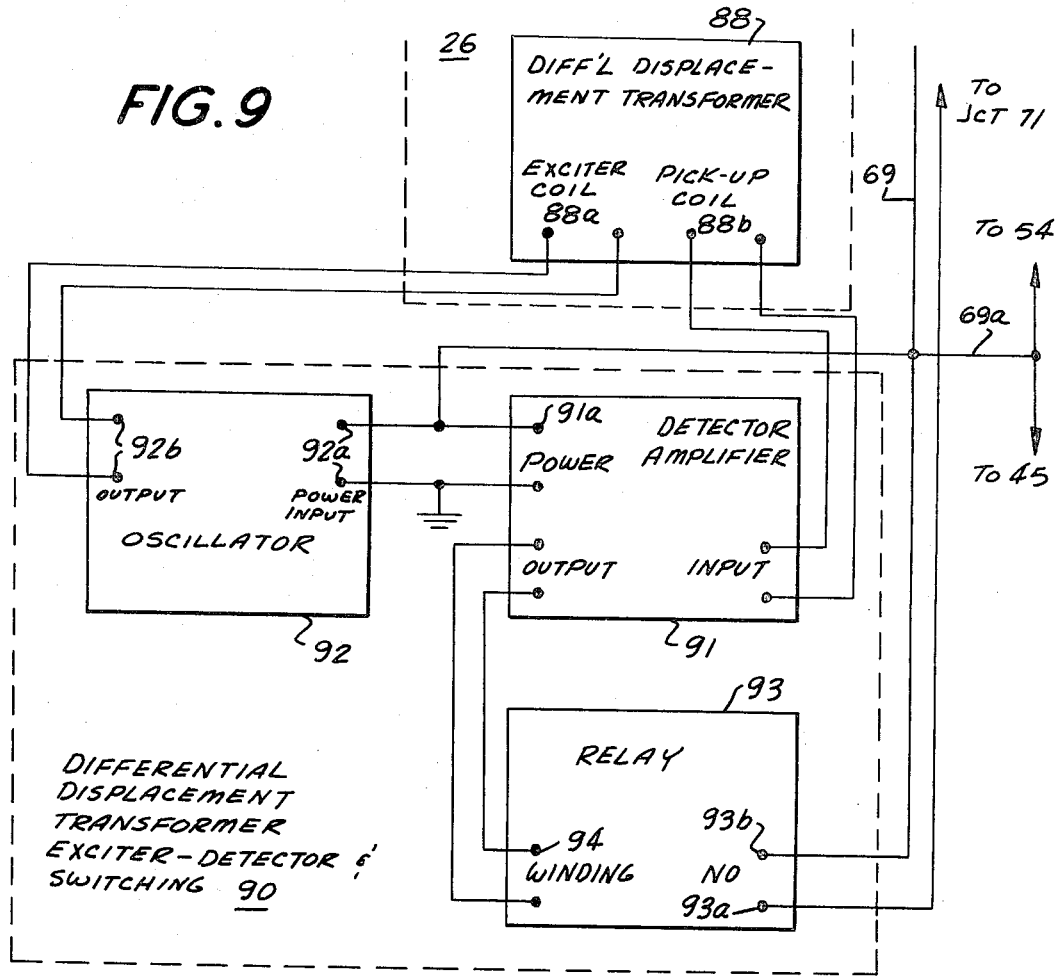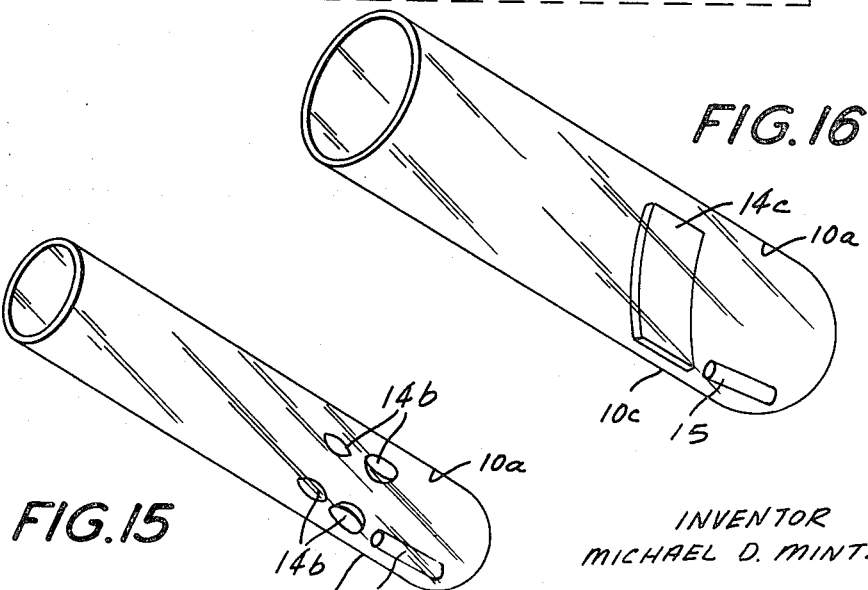

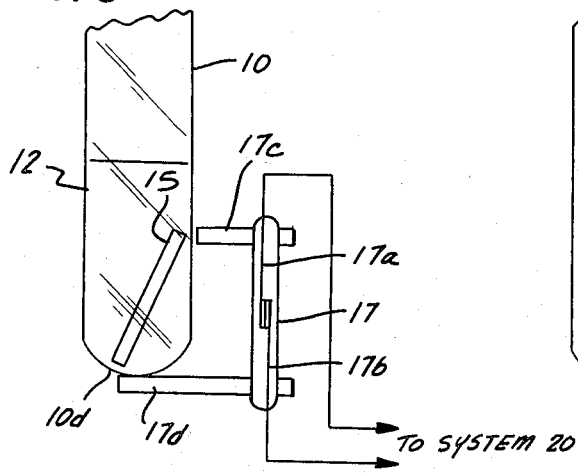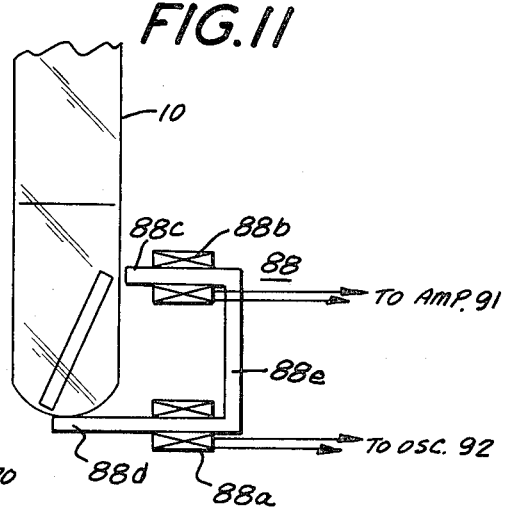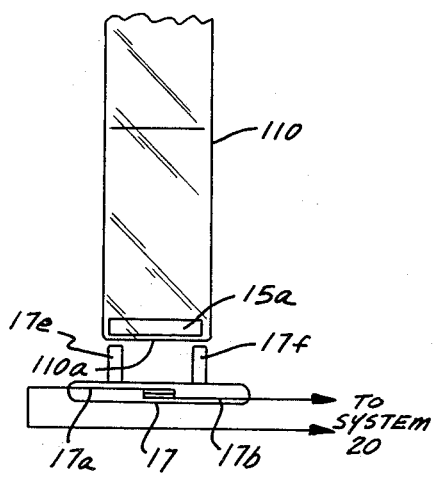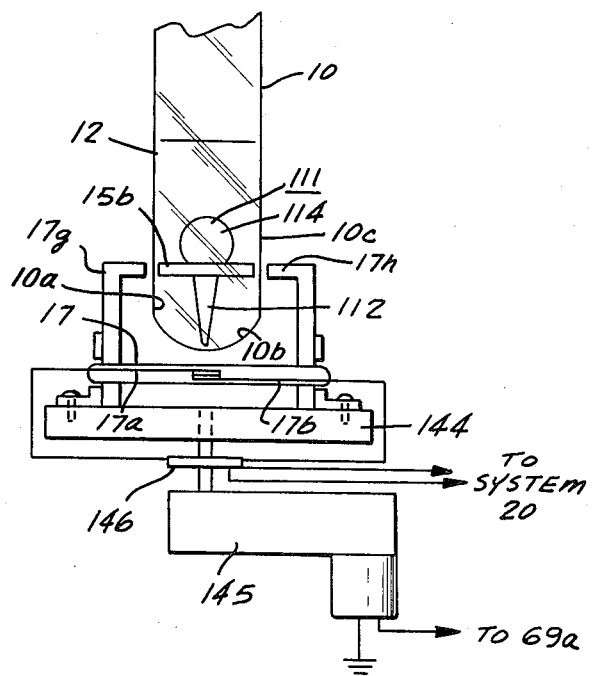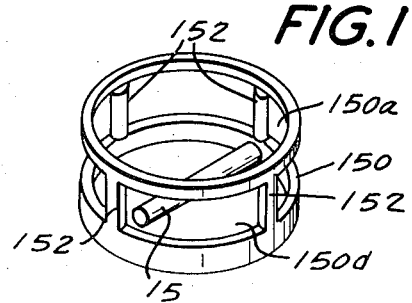

United States Patent Office 3,695,842
Patented Oct. 3, 1972

3,695,842
METHOD AND SYSTEM FOR ANALYZING
A LIQUID
Michael D. Mintz, Edison, N.J., assignor to International
Technidyne Corporation, Edison, N.J.
Filed Mar. 12, 1970, Ser. No. 19,003
Int. Cl. G01n 11/10, 33/16
U.S. Cl. 23—230 R
32 Claims

ABSTRACT OF THE DISCLOSURE

An analysis of the time duration it takes for a liquid to transform itself to a gelatinous or solid mass. A vessel contains a magnetically permeable member immersed in the liquid and magnetic flux lines are passed through the member and the zone. To agitate the liquid, a relative motion is produced between the zone and the member. A predetermined change in the magnetic flux lines is detected when the liquid transforms itself and a signal is generated at the time of such detection.

BACKGROUND OF THE INVENTION

(A) Field of the invention

This invention relates to the field of art of the analysis of a substance as it transforms itself from a liquid to a gelatinous or solid mass.

(B) Prior art

It is well known that a liquid may transform itself under certain conditions to a gelatinous or solid mass by a chemical reaction. An example of such chemical reaction, is that displayed by an epoxy resin mixture as it transforms itself from a liquid to a solid mass in a process usually called polymerization. In another example of such a chemical reaction, liquid blood is through a series of enzyme processes usually called coagulation, converted to a gelatinous mass defined as a thrombus or clot. The formation of such clot within the circulatory system has been known to result in serious if not fatal consequences, particularly where such clot lodges within the heart or the brain. For this reason, coagulation inhibiting agents may normally be administered to patients having suffered cardiovascular crises and certain surgical procedures. Accordingly, the time required for clot formation within a standard laboratory test tube has been interpreted as an indication of the level of such inhibiting agents within a patient's circulatory system.

In general, blood coagulation tests as performed in laboratories, may be considered to be in two basic categories. One of the categories involves analyzing the clotting or "Prothrombin" time of a mixture of anti-coagulated blood and standardized reagents which are added after the blood is drawn from the patient. The other category involves analyzing the clotting time of whole or venous blood including the foregoing inhibiting agents which have previously been administered to the patient. In both categories of tests it has been known in some prior instruments to determine the clotting time by a method of clot detection involving means of agitating the blood specimen and then observing the time of occurrence of complete gelation of the blood specimen as such gelation results in mechanical resistance to the foregoing agitation.

Specifically, in determining the clotting time of whole or venous blood in the second category, the clotting time is defined as the time between the time that the blood specimen is taken from the patient and the time of occurrence of the complete gelation of the blood specimen. It has previously been the practice for a technician to perform this time analysis manually in one or more laboratory test tubes according to the method of Lee and White, "A Clinical Study of the Coagulation Time of Blood," American Journal of Medical Science, volume 145, pages 495–503, 1913. Other reference for this method are: Todd and Stanford, "Clinical Diagnosis by Laboratory Methods," 14th edition, W. B. Saunders Co., Phila., Pa., 1969, page 416; Wintrobe, "Clinical Hematology," Lea and Febiger, Phila., Pa., 1967, pages 326–329. However, the resultant data of the time analysis has been dependent upon the skill and consistency of such technician. Instruments have been developed which perform some of the specified operations automatically in an attempt to provide the advantages of more consistent test results and reduced technician time. However, such prior devices have either lacked the reliability essential to clinical application or have so altered the test conditions that the factors normally active in the clotting process are substantially influenced by the test itself. In a prior system described in the American Journal of Clinical Pathology, vol. 46, No. 4, "A Solid State Whole Blood Coagulation Time Device," by Joseph Beeman, M.D., clotting time is determined optically by the interruption of a light beam to a photoelectric sensor. Such optical sensing techniques have been found by some investigators to be unreliable especially when low pigmentation or settling of pigmented components of the blood present a near colorless liquid to the sensing element.

SUMMARY OF THE INVENTION

A system and method of analyzing a liquid as it transforms itself to a gelatinous or solid mass. A member of magnetically permeable material is disposed within a zone containing the liquid and magnetic flux lines are passed through the member and the zone. A relative motion is produced between the zone and the member to agitate the liquid. When the liquid transforms itself the member is displaced from an initial predetermined position and this displacement is detected upon occurrence of a predetermined change in the magnetic flux lines. A signal is generated at the time of occurrence of the predetermined flux line change.

In this manner there is provided an automatic detection of the liquid transformation with consistent test results and reduced technician time.

Further in accordance with the invention, the zone may comprise a reaction tube closed at least at one end with at least one member extending from the inner surface of the tube. The extending member provides a mechanical grip on the transformed liquid thereby gripping the transformed liquid to the inner surface.

DESCRIPTION OF THE DRAWINGS

FIGS. 2–7 illustrate in varying detail the structural features of the analyzer system 20 embodying the invention;

FIG. 9 illustrates an electrical block diagram of a modification of FIG. 8;

FIGS. 10–13 illustrate further embodiments of the invention in which the reaction tube is vertical;

FIGS. 14–16 illustrate further embodiments of the invention in which differing structures grip the clot; and FIG. 17 illustrates a still further embodiment of the invention of a differing shaped reaction vessel.

BASIC ANALYSIS SYSTEM

Figure 1:
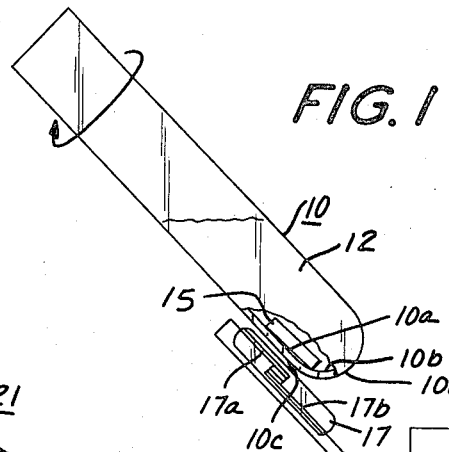
FIG. 1 illustrates the basic analyzer system of the tube, proximity detector and analyzer system.

Referring now to FIG. 1 there is shown a basic system of analyzing a liquid as it transforms itself to a gelatinous or solid mass within a reaction zone such as a glass reaction tube 10. The particular liquid analyzed within tube 10 may be blood 12 which transforms itself to a gelatinous mass. Tube 10 may be defined as being a nonmagnetically permeable vessel which is closed at least at one end. Specifically, reaction tube 10 is cylindrically shaped and comprises an inner side wall 10a, an inner bottom surface 10b, an outer side wall 10c and an outer bottom surface 10d. For purposes of definition, wall 10a and surface 10b are defined as the inner surface 10a–b of tube 10 while wall 10c and surface 10d are defined as the outer surface 10c–d of tube 10. While the illustrated reaction tube 10 is of conventional type having substantially hemispheric inner and outer bottom surfaces 10b and d it will be understood that the bottom surfaces may have differing shapes such as flat for example.

A member 15 of magnetic permeable material is immersed in blood 12 and lies on the inner surface 10a–b of tube 10. When tube 10 is inclined with the axis of symmetry at a preferred angle of approximately 60 degrees from the vertical, member 15 touches inner side wall 10a and inner bottom surface 10b. To operate as a proximity detector or switch a magnetic field sensor such as a reed switch 17 is located beneath reaction tube 10 with the metal reeds 17a–b of switch 17 preferably parallel to member 15.

In the foregoing manner a circuit of magnetic flux lines is formed between member 15 and reeds 17a–b through the inner and outer surfaces of reaction tube 10. In the embodiment of the invention shown in FIG. 1, member 15 is a solid cylindrical plastic or wax coated permanent magnet and is the sole source of the magnetic flux lines which are effective to cause reeds 17a–b to close with magnet member 15 in its illustrated position. It will be understood that the forementioned magnetic flux line circuit between member 15 and reeds 17a–b may only be formed if the materials comprising these components are characterized by magnetic permeability of magnitude substantially greater than that of the adjacent environment. In practice, such materials are typically of the class of abnormally high permeability materials known as ferromagnetic.

In operation, switch 17 is maintained fixed or stationary and reaction tube 10 is rotated about its axis in the illustrated clockwise direction at a slow speed such as .25 r.p.m. As reaction tube 10 is rotated, member 15 rolls freely and remains substantially in its illustrated initial predetermined lowest position as a result of the force of gravity plus the mutual magnetic attraction of member 15 and reeds 17a–b. In this manner there is produced a relative motion between the inner surface 10a–b of reaction tube 10 as it rotates and member 15 which results in an agitation of blood 12. Specifically blood 12 as it rotates within reaction tube 10 is impeded in its rotational motion upon encountering member 15. Thus blood 12 is forced to flow around member 15 and the blood is thereby agitated. With the progression of time, the coagulation process of the blood procedes with a gradual thickening or gelation of blood 12. This results in an increased drag on member 15 which in its final stages is equivalent to a complete adhesion of member 15 to inner surface 10a–b by the coagulated blood.

Specifically the gelatinous mass of coagulated blood forms adhesive forces and also mechanical forces between member 15 and inner surface 10a–b. As reaction tube 10 continues to rotate, member 15 departs or is displaced from its initial position. Thus, it may be said that when the foregoing adhesive and mechanical forces are of sufficient magnitude to overcome the forces of gravity and mutual magnetic attraction maintaining member 15 in its initial position, then member 15 departs from such position.

As member 15 is displaced, there is a resultant reduction in the magnetic flux lines which cause reeds 17a–b to be closed. When this displacement is sufficient and the reduction of magnetic flux lines has progressed to a sufficient degree, then reeds 17a–b open. This opening of the reed switch is detected by an analyzer system 20. A clock in system 20 had previously been started at the initiation of the coagulation test. This clock is stopped at the time of the opening of switch 17 and thus there may be directly read the period or duration of time required for clot formation.

In this manner, it may be concluded that analyzer system 20 detects a change in the magnetic flux lines upon displacement of member 15 from its initial lowest position when blood 12 solidifies forming adhesive and mechanical forces of sufficient magnitude to overcome the gravitational and mutual magnetic forces maintaining the member in its initial position. Thus switch 17 detects a change in the position of member 15 and may be defined as an electromagnetic proximity detector, sensitive to a predetermined displacement of member 15.

It will be understood that instead of blood 12, there may be analyzed another liquid such as a prepolymer resin which converts itself by polymerization to a solid plastic material. A specific example of such a prepolymer resin is an epoxy resin mixture. In this manner, the test would determine the time it takes for an epoxy resin to transform itself to form adhesive and mechanical forces between member 15 and the inner surface 10a–b of sufficient magnitude to overcome the forces maintaining the member in its initial position.

Figure 3:
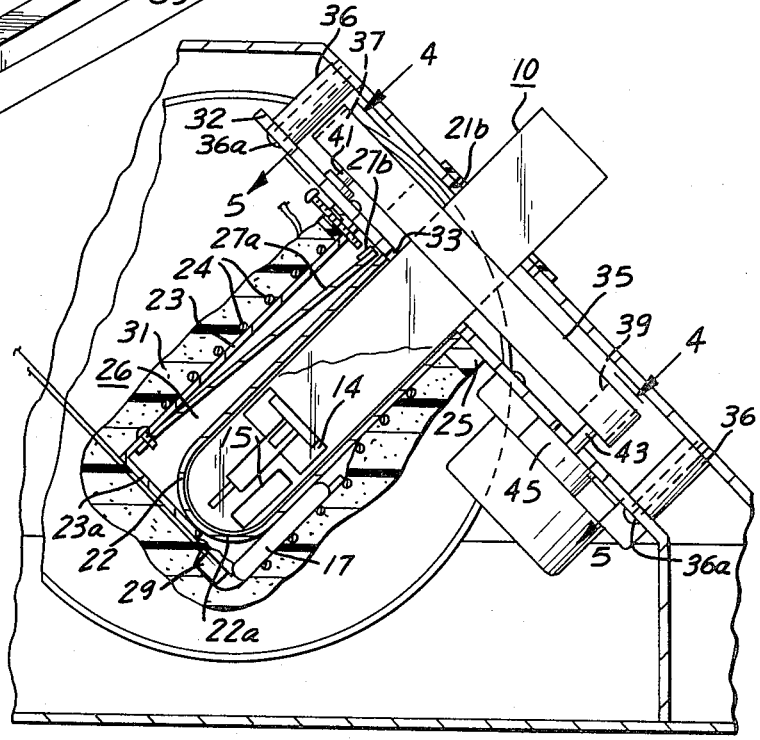

Blood which has certain clotting deficiencies may not always provide sufficient forces between member 15 and the smooth inner surface 10a–b to overcome the above described magnetic and gravitational forces. A particular example of such a deficiency is displayed by blood which has been treated with therapeutic doses of the anticoagulant, Heparin. Clots formed by heparinized blood appear to consist of filament and web-like structures that adhere readily to themselves but are attached to foreign surfaces only at their extremities. During formation of such clots the forces tending to maintain member 15 in its initial predetermined lowest position along inner side wall 10a may result in the failure of these fragile bonds. As reaction tube 10 continues to rotate thereafter there is produced a slipping motion of the entire clot relative to the inner surface 10a–b. Accordingly, to prevent such slipping, inner side wall 10a may be effectively modified as shown in FIGS. 3, 3A and 5 by wedging a symmetrical plastic structure 14 into position within tube 10. Structure 14 comprises four rectangular shaped fins 16 radially extending from a hub and a stem 18 extending from one end of the hub toward bottom surface 10b. A barrier disc 19 is formed at the other end of the hub to confine member 15 within the testing volume. Structure 14 is positioned so that the bottom edge of the fins are sufficiently above member 15 to allow clearance so that member 15 moves or rolls freely as tube 10 is rotated.

The function of fins 16 is to provide a mechanical "grip" on or adhesion to the clot thereby forcing the clot to rotate with the inner surface 10a–b of tube 10. When the clot has attained a sufficient degree of firmness, member 15 is similarly mechanically gripped or confined by the rotating clot and is thereby displaced upwardly from its initial normal position as tube 10 rotates. It is the detection of this displacement to a line above the centerline or axis of the tube which is used to electronically identify the end point condition of clot formation. It will be understood from the foregoing example of clotting deficiencies that such clot formations may be discretely rather than uniformly distributed throughout the blood 12. In such cases member 15 may be displaced in the described manner resulting in the identification of an end point condition other than one associated with complete gelation of the blood 12.

The purpose of stem 18 is to prevent member 15 from attaining a position along the axis of tube 10 since such displacement from the initial position to the axis may be insufficient to deactuate switch 17. Specifically without stem 18, member 15 may be forced by the clotting blood in an objectionable spiral path from its initial position around and toward the tube axis instead of preferably rotating with inner wall 10a in a circular path around the axis. It will be understood that in such a circular path member 15 is displaced rapidly at a greater distance from switch 17 as compared with the spiral path.

All surfaces within tube 10 are so treated as to avoid contaminants that may undesirably influence the clotting process. More particularly, the materials comprising structure 14 and the coating of member 15 may be non-wetting and non-migrating substances such as polyethylene, silicone, or high temperature waxes.

In the assembly of tube 10 (FIGS. 3, 3A, and 5) member 15 is first inserted into tube 10 taking into consideration the magnetic pole direction required by switch 17. Structure 14 is then wedged into position within the tube and maintained in this location by frictional forces between inner side wall 10a and the outermost surfaces of fins 16.

After tube 10 has been assembled with structure 14 and member 15 prior to use it may be prerinsed with a saline solution. Excess moisture is removed from the tube by a series of rapid wrist motions as in shaking down a thermometer. As will later be described in detail with respect to analyzer system 20 shown in FIGS. 2–8 appropriate prewarming and timer reset procedures are followed and a blood specimen is taken from the patient by the use of a collecting syringe. The blood specimen is then transferred from the syringe to tube 10 filling it until the fluid surface is approximately level with disc 19. The tube is then placed in a test cavity in the manner later to be described.

The foregoing saline rinsing and specimen transfer procedures may be facilitated by sealing tube 10 with a tight fitting rubber stopper 11 having a thin central diaphragm 11a as shown in FIG. 3B. Accordingly, tube 10, stopper 11, structure 14 and member 15 comprise an expendable specimen container system which is only usable for one analysis. In this system, the saline rinsing is accomplished at the time of manufacture after which a predetermined vacuum is drawn within tube 10. In operation the specimen container system functions as its own specimen collecting syringe by the use of a double-ended hypodermic needle in the manner described in J. J. Kleiner, U.S. Pat. No. 2,460,641. One end of the needle is used to perform a vena puncture and the second to penetrate diaphragm 11a of stopper 11. The vacuum in tube 10 draws the required volume of blood into the tube as determined by the sealed free volume and degree of vacuum imposed. Preferably the fluid surface is approximately level with disc 19.

During the analysis, with tube 10 being rotated, the surface tension of blood 12 along tube inner wall 10a, barrier disc 19 and the surfaces of fins 16 is effective so that the blood is retained almost entirely beneath disc 19 in spite of the previously described steep angle of inclination of approximately 60 degrees. In this manner the wetting and draining of the surfaces in tube 10 by the liquid blood 12 due to tube rotation is minimized as are corresponding acceleration effects upon the clotting process.

ANALYZER SYSTEM 20

Referring now to FIGS. 2–8 there is shown an analyzer system 20 according to the invention which is capable of analyzing the coagulation time of blood as well as other liquids which transform themselves from a liquid to a gelatinous or solid mass. However, analyzer system 20 has been specifically designed for the convenience of a medical technician in the performance of routine whole blood coagulation analysis.

Analyzer system 20 comprises a metal housing 21 having a sloping front panel 21a and an opening 21b into which reaction tube 10 is inserted. Tube 10 is received in an incubator test cavity 26 comprising a hollow aluminum cylinder 22. Closely formed above cylinder 22 is a box-like housing 23 formed of sheet aluminum in a substantially rectangular shape. Reed switch 17 is cemented or otherwise secured to the lower outer wall of cylinder 22 and switch 17 is in its previously described position with respect to tube 10 and member 15 with the tube in test cavity 26. Heater wire 24 is wound in a bifilar manner about the periphery of cylinder 22, housing 23 and switch 17. Cylinder 22 is formed having a closed lower end 22a adjacent tube bottom surface 10d and an open upper end received in an opening 25a of a phenolic plastic contact and mounting block 25. A pair of screws 27c and 28c are threadedly engaged in an upper end of block 25 and extend into opening 25a. Screws 27c and 28c each comprise one terminal of normally open switch 27 and normally closed switch 28 respectively. The other terminal of each switch 27–28 comprises bimetallic thermostat leaves 27a and 28a respectively having secured to one end thereof silver contacts 27b–28b respectively. The other ends of leaves 27a–28a are secured to housing 23. Contacts 27b–28b are adapted to engage the ends of screws 27c–28c respectively which are silver tipped. The function of switches 27 and 28 will later be described in detail.

In one form of the invention an additional magnet may be used to provide reed switch 17 with a magnetic bias. As illustrated, magnet 29 is secured to housing end 23a. This magnetic bias is not sufficient without the magnetic force of magnet member 15 to close reeds 17a–b. On the other hand, this magnetic bias is not so strong as to maintain reeds 17a–b in a closed position when member 15 is displaced from its initial position as previously described. The purpose of the magnetic bias is to adjust the sensitivity of switch 17 to displacements of member 15 and thus magnet 29 may be used to supplement the magnetic flux of member 15 in cases where member 15 has a low magnetic flux value and may have difficulty alone in closing the switch. On the other hand, by reversing the pole position of bias magnet 29, it is effective to decrease the magnetic flux of member 15 in those cases where the member provides an excessive magnetic flux.

In order to thermally insulate test cavity 26 and housing 23 and thereby to decrease heat loss, an insulation material such as urethane foam 31 is wrapped around the exposed outer side walls and lower surfaces 22a and 23a of cylinder 22 and housing 23, respectively.

The flat face of block 25 remote from cylinder 22 and housing 23 is secured by screws 34a, FIG. 5, to a support chassis 32 having an opening 33, cooperating with the circular portion of opening 25a in mounting block 25. Support chassis 32 is secured within housing 21 by means of cylindrical support members 36 and screws 36a. Panel opening 21b is axial with opening 33 and the outer wall 10c of reaction tube 10 is engaged by an inner surface of an elastic drive belt 35. Belt 35 is engaged by an idler pulley 37 and a drive pulley 39 with tube 10 disposed between the two pulleys. Idler pulley 37 is journaled in a shaft 41 which is secured to chassis 32. Pulley 39 is journaled in a shaft 43 of a motor and gear reduction assembly 45 which is secured to chassis 32 by screws 46. In this manner, upon energerization of motor assembly 45, tube 10 is rotated at a constant speed which is preferred for blood analysis, as for example, .25 r.p.m.

Figure 2:
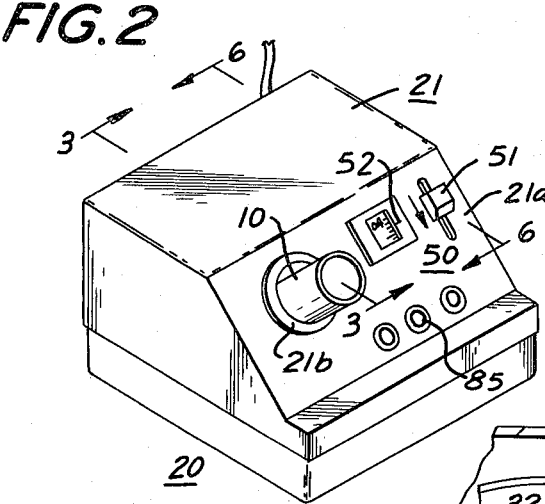
Figure 4:
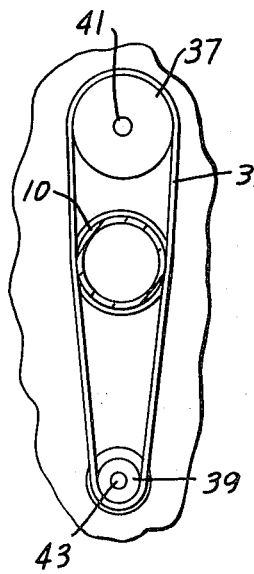

As shown in FIGS. 2, 6 and 7, a chronographic escapement or elapsed time meter 50 comprises a manual reset lever 51, a chronometer drive motor 54, a timer escapement plate 55 and a rotating drum 56. Drive motor 54 is secured in timer housing 53 the top face 53a of which is fixed to support chassis 32 by means of cylindrical support members 58. One side of circular escapement plate 55 is secured to a front face 53b of housing 53 so that the plate is rigidly held in a plane perpendicular to the plane of panel 21a. Reed switches 60 and 61 are radially disposed and fixedly secured to the other side of plate 55 remote from housing 53. Reed switch 60 is a normally open low time limit switch while reed switch 61 is a normally closed high time limit switch. Switch 61 is maintained normally closed as a result of the placement of a bias magnet 62 adjacent and parallel to the switch. Magnet 62 is disposed within an indentation in plate 55 and secured therein with cement for example.

A timer shaft 64 of drive motor 54 extends out of housing face 53b and rotates at a uniformly precise speed as for example one revolution per hour. Shaft 64 is received and secured within an opening in a hub 66 fixed to the center of a disc shaped portion 56a of drum 56. A magnet 67 is received within an opening 68 formed radially of and through both sides of the disc shaped portion 56a. Drum 56 also includes a cylindrical timer scale 56b having one edge secured to the periphery of disc portion 56a. In addition, a counterweight 56c is secured to disc portion 56a substantially opposite magnet 67 in order to effectively balance the weight about shaft 64.

When in its initial position drum 56 is rotated so that magnet 67 is adjacent reed switch 60 and the zero time marking on scale 56b is then lined up with marker 52 on panel 21a. In operation elapsed time meter 50 is zeroed by actuating manual reset lever 51 and the reeds of switch 60 close. Since reed switches normally have an amount of hysteresis, the reeds of switch 60 remain closed, once thrown, as drum 56 rotates away from the switch until approximately two and one-half minutes have elapsed. Switch 61 is maintained normally closed by bias magnet 62 until drum 56 rotates almost a complete rotation and magnet 67 short circuits magnet 62 and allows the reeds of switch 61 to open.

Figure 8:
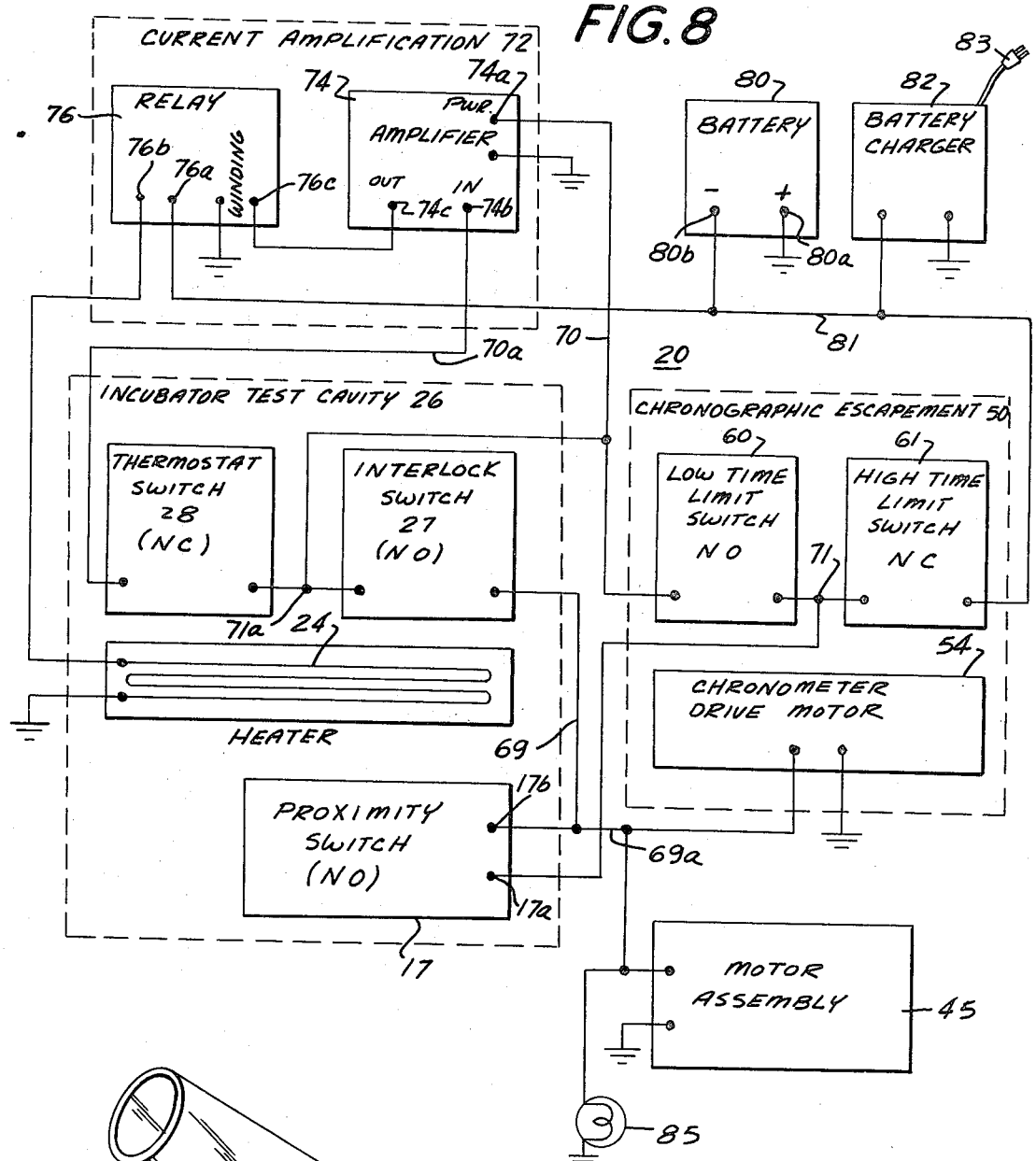
FIG. 8 illustrates an electrical block diagram of the analyzer system of FIGS. 2–7.

As shown in the electrical block diagram of FIG. 8, one terminal or reed of each of switches 60 and 61 is connected to a junction 71 which is coupled to one terminal or reed 17a of switch 17. The other terminal or reed 17b is connected by way of conductor 69, switch 27, junction 71a, switch 28, and conductor 70a to an input terminal 74b of amplifier 74. Amplifier 74 is a part of a current amplification circuit 72 and operates to produce an output signal at output terminal 74c upon application (1) of a supply current to power terminal 74a and (2) an input signal to input terminal 74b. In this manner amplifier 74 effectively operates as an AND gate.

Circuit 72 also includes a relay 76 having normally open switch terminals 76a–b and input terminal 76c connected to output terminal 74c. Upon application of an input signal to terminal 76c, relay 76 is switched to close terminals 76a–b.

Switch 27 operates as an interlock switch in that it is normally open until the temperature in test cavity 26 has increased to a predetermined value at which time the switch closes. Switch 28 operates as a normally closed thermostat switch which opens when the temperature in test cavity 26 has increased to a predetermined value. Switches 27 and 28 are adjusted so that as the test cavity temperature increases in value, switch 27 closes before switch 28 opens with a preferred temperature separation of about 5 degrees F.

A battery 80 has a positive terminal 80a connected to ground and a negative supply terminal 80b connected by way of a conductor 81 to terminal 76a and to the other terminal or read of switch 61. A battery charger 82 is contained within the housing 21 and is provided with a plug 83 for connection with a conventional AC wall outlet. In this manner, after battery 80 has been charged, system 20 is fully portable with a self contained source of supply and is not dependent upon the availability of a wall outlet. The operation of system 20 will first be described with respect to the following Table A.

Where:

X = switch closed
O = switch open

TABLE A—NORMAL COLD START OPERATING SEQUENCE

| State | High time limit switch 61 | Low time limit switch 60 | Thermostat switch 28 | Interlock switch 27 [1] | Proximity switch 17 | Function |
|---|---|---|---|---|---|---|
| 0 | X | O | X | O(O) | O | Cold, inactive condition. |
| 1 | X | X | X | O (+) | O | Depress lever 51, zero time meter 50, begin prewarming. |
| 2 | X | X | X | X (O) | O | Prewarming completed, heater 24 on. |
| 2A | X | O/X | O | X (O) | O | Heater 24 off. |
| 3 | X | X | O/X | X (O) | O | Depress lever 51 to zero time meter 50 and take specimen. |
| 4 | X | X | O/X | X (O) | X | Tube 10 placed in cavity 26. |
| 5 | X | O | O/X | X (O) | X | System in proximity switch 17 control mode. |
| 6 | X | O | O/X | X (O) | O | Clot detected, motors 45 and 54 and heater 24 deenergized. |
| 7 | X | O | X | O (O) | O | System returned to cold inactive state. |

[1] Polarity of conductor 69 with respect to junction 71a.

TABLE B.—TIME OVER-RUN TEST FROM NORMAL COLD START

| State | High time limit switch 61 | Low time limit switch 60 | Thermostat switch 28 | Interlock switch 27 [1] | Proximity switch 17 | Function |
|---|---|---|---|---|---|---|
| 0–5 | | | As set forth in Table A | | | |
| 6A | O | O | O/X | X (O) | X | Test terminated, motors 45 and 54 and heater 24 deenergized. |
| 7A | O | O | X | O (O) | O | System returned to cold inactive state and, tube 10 removed from cavity 26. |

TABLE C.—HEATER 24 LATCH-OUT SEQUENCE

| State | High time limit switch 61 | Low time limit switch 60 | Thermostat switch 28 | Interlock switch 27 [1] | Proximity switch 17 | Function |
|---|---|---|---|---|---|---|
| 0–5 | | | As set forth in Table A | | | |
| 5' | X | O | X | O(−) | X | System running cold in proximity switch 17 control mode. |
| 6B–7B | X | O | X | O(O) | O | Clot detected, motors 45 and 54 deenergized, system returned to cold, inactive state. |

[1] See footnote at end of Table A.

TABLE D.—FAST THERMAL SYSTEM

| State | High time limit switch 61 | Low time limit switch 60 | Thermostat switch 28 | Interlock switch 27 [1] | Proximity switch 17 | Function |
|---|---|---|---|---|---|---|
| 0 | X | O | X | X [2] | O | Cold, inactive condition. |
| 1-2A | | | | Not used | | |
| 3C | X | X | X | X (O) | O | Depress lever 51 to zero time meter 50 and take specimen. |
| 4-6 | | | | As set forth in Table A | | |
| 7C | X | O | X | X | O | System returned to cold, inactive, state. |

[1] See footnote at end of table A.
[2] Always closed.

To start state 0 tube 10 is removed from cavity 26 and thus switch 17 is open. The technician actuates lever 51 (state 1) which is effective to zero lapsed time meter 50 thereby to close low time limit switch 60. With switch 60 closed a circuit may be traced from negative supply terminal 80b, conductor 81, normally closed switch 61, junction 71, switch 60 and then by way of a conductor 70 to terminal 74a and also by way of conductor 70, junction 71a, normally closed thermostat switch 28 and conductor 70a to terminal 74b. Thus with the negative supply potential applied to terminal 74a and terminal 74b, amplifier 74 produces an output signal to energize relay 76 and thereby to close terminals 76a-b thus closing the energization circuit for heater wire 24 to begin prewarming. In this manner, heater wire 24 is effective to heat cavity 26 until normally open interlock 27 closes and the prewarming is completed (state 2). With switch 27 closed the negative potential is applied from terminal 71a through switch 27, conductors 69 and 69a to chronometer motor 54 and motor assembly 45 both connected in parallel to ground. A light bulb 85 is connected in shunt with motors 54 and 45. Accordingly when switch 27 closes motors 45 and 54 and bulb 85 are energized. The lighting of bulb 85, located on panel 21a, indicates to the technician that he may proceed with the analysis since cavity 26 has been sufficiently warmed. At this time elapsed time meter 50 and motor assembly 45 are operating. It will be understood that thermostat switch 28 controls the heat in cavity 26 so that when the temperature increases in value sufficiently to open the switch, relay 76 then opens which deenergizes the heater circuit (state 2A).

Just prior to taking a blood specimen, the technician again actuates lever 51 (state 3) thereby to zero elapsed time meter 50. After the specimen is taken it is inserted in tube 10 and the tube is placed in cavity 26 (state 4) where it is steadily rotated in the heated cavity. With tube 10 in the cavity, member 15 is effective to close switch 17 and thus the negative supply potential may be traced by way of junction 71 and switch 17 to conductor 69a. In this manner motors 45 and 54 and bulb 85 are maintained energized when switch 60 opens (state 5) which occurs upon movement of magnet 67 after approximately 2½ minutes subsequent to the zeroing of meter 50. Accordingly, if the technician has zeroed the timer but forgot to insert the tube in the cavity, system 20 is automatically stopped after a predetermined time duration by the opening of low time limit switch 60.

With tube 10 in test cavity 26, analysis continues with both the elapsed time meter 50 and motor assembly 45 energized until a clot is formed and switch 17 opens (state 6) for the reason previously described. It will be understood that such change in mechanical state of reed switch 17 serves to substantially vary its ability to conduct electrical energy. Thus, with reeds 17a-b closed, the electrical conductance of reed switch 17 is essentially infinite, whereas, when reeds 17a-b open, the conductance may become substantially zero. Accordingly, the negative potential is no longer supplied to conductors 69 and 69a and (1) elapsed time meter 54 and motor assembly 45 stop, and (2) amplifier 74 is deenergized thereby opening relay 76 and deenergizing the heater control circuit comprising current amplification circuit 72 and thermostat switch 28. In this manner, the elapsed time read on scale 56b indicates the time of clot formation and analyzer system 20 is deenergized and ready for another analysis. If another test is not run, the cavity temperature decreases in value until switch 27 opens and the system returns to the cold, inactive state (state 7).

The operation of system 20 has been outlined with respect to a time over-run test in Table B. In Table B, the sequence involves a clot not being detected. Thus the proximity switch 17 control mode (state 5) continues until high time limit switch 61 is actuated (state 6A). When tube 10 is removed from cavity 26, state 7A is the same as state 7 of Table A.

As set forth in Table C the operation of system 20 is described in which heater 24 latches out. Table C sets forth the sequence in which during the proximity switch 17 control mode (state 5) the system runs cold and interlock switch 27 opens (state 5'). The reason for the system running cold may occur, for example, from battery 80 approaching charge depletion. Accordingly, the system continues in the normal manner with motors 45 and 54 energized until the clot is detected. The motors are then deenergized and the system returns to the cold, inactive state which is indicated in Table C as states 6B-7B which is the same as state 7 of Table A.

It may be desirable to use a fast thermal system in which heater 24 rapidly increases in temperature to the desired value. The period of time it takes to reach the desired temperature may be less than that required for the technician to take the blood specimen. Accordingly, the prewarming phase of Table A (states 1, 2 and 2A) may be eliminated by merely short circuiting interlock switch 27 to provide the sequence set forth in Table D. In Table D the technician initially depresses lever 51 to zero time meter 50 and then begins to take a specimen (state 3C). While the technician is taking the specimen, cavity 26 heats up to the desired temperature and tube 10 is then inserted in the properly warmed cavity.

FIG. 9 ANALYZER SYSTEM

It will be understood that the detection of predetermined changes in the magnetic flux lines which pass through tube 10 may be detected by devices other than reed switch 17. For example, as shown in FIG. 9 in system 20, switch 17 is replaced by a conventional differential displacement transformer 88 which may be used together with an exciter-detector and switching system 90. Transformer 88 comprises an exciter coil or primary winding 88a and a pickup coil or secondary windings 88b and is mounted in a position similar to switch 17 illustrated in FIG. 3. For the system of FIG. 9 magnetically permeable member 15 may or may not be permanently magnetized and acts as the core of transformer 88. Upon application of a DC source supply to its input terminal 92a, oscillator 92 produces an excitation signal at signal terminals 92b which are applied to exciter coil 88a. Accordingly coil 88a produces an oscillating magnetic field, forming a circuit of magnetic flux lines between coil 88a and member 15 through the inner and outer surfaces of tube 10. As in the manner previously described, member 15 is maintained in its initial position as a result of the combined forces of gravity and magnetism.

Pickup coil 88b comprises a pair of secondary windings which are connected in series opposition and coupled to exciter coil 88a by way of the magnetic flux line circuit passing through member 15. As member 15 is displaced from its initial position, the ability of transformer 88 to conduct electrical energy from oscillator 92 is substantially reduced. Thus, detector amplifier 91, the input of which is coupled to coil 88b, produces a voltage inversely proportional to the displacement of member 15 from the initial position. The output of detector amplifier 91 is applied to the winding 94 of a relay 93 which is deactuated when there is a predetermined change in the flux lines upon displacement of the member from its initial position.

The normally open switched contacts 93a–b are connected in a manner similar to that of switch 17. Specifically, contact 93a is connected to junction 71 and contact 93b is connected to conductors 69 and 69a. In addition the supply terminal 92a for oscillator 92 and supply terminal 91a for detector amplifier 91 are connected to conductors 69 and 69a so that circuits 92 and 91 are supplied with power only during the times motors 45 and 54 are energized.

FIGS. 10–13

Instead of being inclined from the vertical as shown in FIGS. 1–3, tube 10 may be maintained in an upright or vertical position. As shown in FIG. 10, member 15 is disposed at the bottom of tube 10. Magnetic pole extensions 17c–d extend from reeds 17a–b respectively with reed switch 17 being fixed in an upright or vertical position. Pole extension 17d extends from reed 17b to approximately the center of bottom surface 10d while pole extension 17c extends from reed 17a to a position on outer side wall 10c.

Magnetic forces between pole extension 17c and the upper end of member 15 normally causes member 15 to assume a slightly inclined orientation so that a completed magnetic flux line circuit is provided between member 15, pole extensions 17c–d and reed switch 17. In FIG. 10, member 15 is maintained in its illustrated initial position by means of magnetic forces and is not dependent on gravity. Thus, higher speeds of rotation of tube 10 may be provided with member 15 being maintained in its initial position solely by magnetic forces. When liquid 12 transforms itself member 15 departs from the initial or predetermined position and reed switch 17 opens.

In similar manner, reed switch 17 may be replaced with a differential displacement transformer 88 as shown in FIG. 11 with transformer 88 being described with respect to FIG. 9. Transformer 88 includes an exciter coil 88a, a pickup coil 88b, a core 88e, and specifically designed pole extensions 88c–d. Pole extensions 88c–d are located similarly to pole extensions 17c–d. Thus, member 15 is slightly inclined to provide a completed magnetic circuit between the member, pole extensions 88c–d and core 88e. In the manner previously described with respect to FIG. 9, upon displacement of member 15 and from its initial position relay 93 is deactuated.

In a further modification as shown in FIG. 12, tube 110 has a flat-bottom 110a and permanent magnet 15a rests horizontally on the flat bottom. Member 15a is of length less than the inner diameter of tube 110. Reed switch 17 is fixed in a horizontal position below bottom 110a with equal length magnetic pole extensions 17e–f extending vertically from reeds 17a–b respectively. Accordingly, it will be understood that a completed magnetic circuit is provided by way of member 15a, pole extensions 17e–f and reed switch 17. In the embodiment of FIG. 12, adhesive and mechanical forces are formed between member 15a, the adjacent inner side wall and the inner surface of tube bottom 110a. It will be understood that instead of reed switch 17 in FIG. 12, a differential displacement transformer may be used to detect a change in the position of member 15 when the liquid transforms itself.

With a vertically oriented tube 10, instead of maintaining proximity switch 17 fixed and rotating the tube, the tube may be maintained fixed or stationary and the switch and member 15 may be rotated in the manner illustrated in FIG. 13. In FIG. 13, a cylindrical magnet member 15b is secured to a structure 111 which comprises a spinner leg 112 and a buoyant node 114. Structure 111 is constructed so that it turns freely in an upright position when immersed in liquid 12. Switch 17 is disposed horizontally below tube 10 and secured to a rotatable turn table 144. Pole extensions 17g–h of L-shape extend from reeds 17a–b respectively to opposing positions on side wall 10c to closely approach member 15b extending longitudinally therebetween. In this manner, a completed magnetic circuit is provided between member 15b, pole extensions 17g–h and switch 17. Motor assembly 145 is effective upon energization to rotate table 144 thereby to rotate switch 17 and pole pieces 17g–h about the same axis as the axis of symmetry of tube 10. Accordingly, magnetic member 15b is magnetically attracted to and rotates with pole extensions 17g–h while tube 10 is maintained fixed. A commutator 146 is used to connect reeds 17a–b to analyzer system 20.

With the use of a spinning member 15b, substantially fast speeds may be achieved as compared with the rotating tube assembly previously described. The mixing of liquid 12 is achieved by the relative movement between tube 10 and member 15b. Liquid 12 is being continually sheared between the stationary tube and the moving member 15b and is therefore agitated. For all practical mixing purposes, there is no basic difference between moving the member and maintaining the tube fixed or rotating the tube and maintaining the member in a fixed position. In FIG. 13, when the liquid transforms itself, the change in the flux lines is detected as member 15b adheres to the inner surfaces 10a–b and thus departs from its predetermined position between pole extensions 17g–h.

It will be understood that the spinning of member 15b may be accomplished without the requirement of structure 111 as for example in FIG. 12, tube 110 may be held fixed while switch 17 and extension 17e–f are rotated thereby rotating or spinning member 15b.

FIGS. 14–17

Figure 14:
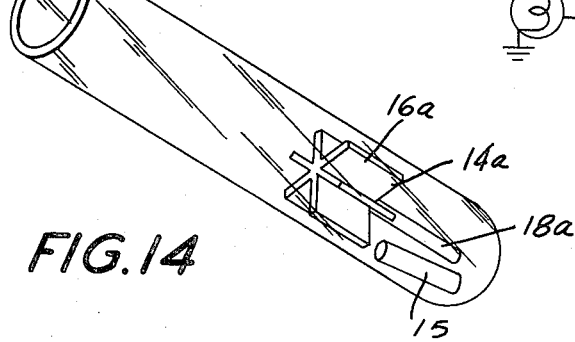

It will be understood that structure 14 of FIGS. 3, 3A and 5 may be modified while still providing the gripping function on the clot. For example, instead of the four fins 16 of structure 14 any number of fins may be used, as for example, six rectangular shaped fins 16a of structure 14a in FIG. 14. The maximum number and the width of the fins are limited by the requirement that the gripping action by the fins on the clot not be impaired by so weakening the integrity of the clot that it is sheared above member 15. In the embodiment of FIG. 14, member 15 is contained within the test or reaction volume as a result of the interference provided by fins 16a without requiring a barrier disc. Specifically the spacing between fins 16a is not sufficient to allow member 15 to pass through.

As shown in FIG. 15, the gripping action may also be provided by extensions or indentations 14b formed at the same height in inner and outer side walls 10a and c. Indentations 14b may be of such width and extend into tube 10 sufficiently to provide a barrier for member 15. However, the barrier or confining feature is not essential if the technician excercises care to insure that member 15 is within the test volume. In addition, in the embodiment of FIG. 15, the stem has been eliminated which may be suitable, for example, with a relatively large tube 10 diameter where the sensitivity of switch 17 permits identification of member 15 displacement from the initial position to a position coaxial with tube 10.

Another modification of structure 14 not having the confining or stem feature is shown in FIG. 16 in which there is provided a single fin 14c bent slightly to provide the frictional forces between wall 10a and the outermost surfaces of the fin. It will now be understood that still further modifications of structure 14 (not shown) may be provided in which at least one member extends from inner side wall 10a projecting inwardly such as a multiplicity of radially directed plastic filaments or bristles.

It will be further understood that tube 10 may be made of materials other than glass which are nonmagnetically permeable and which do not effect the clotting process in an undesirable manner such as polyethylene or polystyrene, or that the inner surfaces 10a–b of tube 10 may be treated by chemical or heat cleaning procedures, or that these surfaces may be coated with a nonreacting material such as silicone for example.

Tube 10 which provides a zone for liquid 12 may have shapes other than those previously described. For example, as illustrated in FIG. 17 the fixed zone for the liquid may have a substantially pill box shape and may be formed as an integral molded plastic reaction tube 150. As illustrated, extending from inner side wall 150a are a plurality of ribs or fins 152 which are similar to the extensions 14b of FIG. 15. Member 15 is free to rotate in a circular indentation formed in the inner bottom surface 150d of tube 150. The diameter of the circular opening is greater in value than the length of member 15. Member 15 may be rotated with respect to fixed tube 150 by means of a motor assembly 145, plate 144 (FIG. 13) having secured thereto reed switch 17 and pole extensions 17e–f of FIG. 12.

It will be understood from the foregoing embodiments that rotation of the reaction tubes 10, 110, 150 or of reed switch 17 or transformer 88, as in FIG. 13 may be in either clockwise or counter-clockwise directions. Such motion may also be of a uniform oscillatory type provided that the degree of rotation in alternate directions causes sufficient displacement of magnetic member 15 when a clot has been formed to be detected by reed switch 17 or displacement transformer 88. As for example, such displacement may be plus and minus 90 degrees for a total of 180 degrees. The total period of oscillation may be, for example, two minutes.

Referring to FIG. 13, the application of an oscillatory rotation to table 144 by motor 145 eliminates the need for commutator 146, and suitable flexible conductors from system 20 may be connected directly to reeds 17a and b of switch 17.

What is claimed is:

1. A method of analyzing a liquid as it transforms itself to a gelatinous or solid mass in which a variable conductance device is disposed adjacent to a zone containing said liquid and a member of ferromatic material is disposed within the zone comprising the steps of
   forming a circuit of magnetic flux lines between the device and the member,
   producing relative motion between the zone and the member,
   detecting a predetermined variation in the conductance of the device upon change in the magnetic flux lines when the liquid transforms itself and the member is displaced, and
   producing a signal at the time the predetermined variation in conductance has been detected.

2. A method of analyzing a liquid as it transforms itself to a gelatinous or solid mass in which a variable conductance device is disposed adjacent to a zone containing the liquid, an independent source of electrical energy is connected to the device and a member of ferromagnetic material is disposed within the zone comprising the steps of
   forming a circuit of magnetic flux lines between the device and the member,
   producing relative motion between the zone and the member,
   detecting a predetermined change in the flow of electrical energy between the source and the device when the device varies in conductance upon change in the magnetic flux lines when the liquid transforms itself and the member is displaced, and
   producing a signal at the time the predetermined change has been detected.

3. The method of claim 2 in which there is provided the further step of providing a force field that tends to maintain the member in a predetermined position relative to the device until said maintaining force field is overcome.

4. The method of claim 2 in which there is provided the further step of beginning the timing of the time duration it take for the liquid to transform itself when the liquid is in a state ready to begin the analysis.

5. The method of claim 2 in which there is provided the further step of providing heat to the liquid and maintaining the liquid at a predetermined temperature.

6. The method of claim 2 in which there is provided the further step of preventing the member from attaining a predetermined position relative to said device upon displacement of the member.

7. The method of claim 2 in which there are provided the further steps of
   inclining the zone in the form of a vessel whereby the member touches an inner side wall of the vessel, and
   rotating the vessel about an axis of symmetry thereof whereby a magnetic force plus the force of gravity tend to maintain the member in a predetermined position relative to the device until said maintaining forces are overcome.

8. A system of analyzing a liquid as it transforms itself to a gelatinous or solid mass comprising
   a zone containing said liquid,
   a member of ferromagnetic material disposed within said zone,
   means for providing relative motion between said zone and said member,
   variable conductance means magnetically coupled through the walls of the zone to said member by way of magnetic flux lines for varying the electrical conductance upon change in said magnetic flux lines when the liquid transforms itself and said member changes position, and
   means for producing a signal at the time of occurrence of a predetermined variation in said conductance.

9. A system of analyzing a liquid as it transforms itself to a gelatinous or solid mass comprising
   a zone containing said liquid,
   a member of ferromagnetic material disposed within said zone,
   means for providing relative motion between said zone and said member,
   variable conductance means magnetically coupled through the surface of the zone to said member by way of magnetic flux lines for varying the electrical conductance upon change in said magnetic flux lines when the liquid transforms itself and said member changes position relative to said conductance means,
   an independent energy source connected to said conductance means for providing through said conductance means an electrical energy flow which changes upon variation in the conductance of said conductance means, and
   means for producing a signal at the time of occurrence of a predetermined change in said energy flow.

10. The system of claim 9 in which there is provided pole extensions for said variable conductance means formed to closely approach ends of said member thereby to provide a substantial magnetic force for maintaining said member in a predetermined position relative to said variable conductance means.

11. The system of claim 9 in which said variable conductance means includes a source of magnetic flux lines to couple said variable conductance means to said member through the surface of the zone.

12. The system of claim 9 in which said variable conductance means comprises a displacement transformer, and said source of electrical energy comprises means for exciting said transformers.

13. The system of claim 9 in which there is provided timing means which is actuated when said liquid is in a state ready to begin analysis for beginning a time period and for terminating the time period upon said signal being generated.

14. The system of claim 9 in which said liquid is blood which transforms itself to a clot.

15. The system of claim 9 in which said zone comprises a vessel and in which there is provided test cavity means for receiving said vessel in an inclined position whereby said member touches an inner side wall of said vessel, means for heating said cavity means,
said variable conductance means comprises a reed switch maintained (1) closed when said member is in a predetermined position relative to said conductance means and (2) open upon occurrence of said change in magnetic flux lines when said member is displaced thereby producing a substantial change in the electrical conductance of said reed switch, and
means for rotating said vessel about an axis of symmetry thereof whereby said magnetic flux lines plus the force of gravity tend to maintain said member in said predetermined position until said liquid solidifies forming adhesive and mechanical forces between said member and the surface of said vessel of sufficient magnitude to overcome said maintaining forces.

16. The system of claim 9 in which there is provided means for gripping said transformed liquid to the surface of said zone.

17. The system of claim 9 in which said ferromagnetic member comprises a source of magnetic flux lines to couple said variable conductance means to said member.

18. The system of claim 9 in which said zone comprises a cylindrically shaped reaction tube having an inner surface and at least one member extending from said inner surface to provide a mechanical grip on said transformed liquid to said inner surface, said extending member being positioned to allow clearance for the movement of said ferromagnetic member as it changes position relative to said inner surface.

19. The system of claim 18 in which there is provided a fixed member disposed on the axis of symmetry of said tube to prevent said ferromagnetic member from attaining a position along the axis of said tube.

20. The system of claim 9 in which said variable conductance means comprises a magnetic proximity detector disposed adjacent to said zone whereby said magnetic flux lines provide a magnetic force tending to maintain said member in a predetermined position relative to said proximity detector.

21. The system of claim 20 in which said magnetic proximity detector is maintained stationary and there is provided means for rotating said zone for providing said relative motion between said zone and said member.

22. The system of claim 20 in which said zone is maintained stationary and there is provided means for rotating said magnetic proximity detector for providing said relative motion between said zone and said member.

23. The system of claim 20 in which said proximity detector comprises reed switch means maintained in a closed circuit position by said magnetic flux lines with said member in said predetermined position.

24. The system of claim 23 in which there is provided a source of supply connected to a first terminal of said reed switch, a second terminal of said reed switch being connected to (1) thermostat switch means for controlling said heating means and (2) said rotating means whereby with said reed switch closed the temperature of said heating means is controlled and said vessel is rotated.

25. The system of claim 24 in which said timing means comprises a chronometer drive motor for rotating timing indicia and a low time limit switch which is turned on at the beginning of the time period and is maintained on for a short perod of time thereafter, said limit switch being connected between said source and said thermostat switch means and said rotating means whereby said test cavity is heated and said vessel is rotated for said short time period preparatory to said vessel being inserted in said cavity.

26. A nonferromagnetic reaction tube closed at least at one end for containing a liquid in which the time duration it takes for the liquid to transform itself to a gelatinous or solid mass is analyzed comprising said reaction tube having inner surface,
a ferromagnetic member disposed within said reaction tube and free to move relative to said inner surface, and
at least one member extending from said inner surface to provide a grip on said transformed liquid thereby gripping said transformed liquid to said inner surface, said extending member being positioned in said tube to allow clearance for the movement of said ferromagnetic member.

27. The reaction tube of claim 26 in which there is provided a fixed member disposed on the axis of symmetry of said tube to prevent said ferromagnetic member from attaining a position along the axis of said tube.

28. The reaction tube of claim 26 in which said extending member comprises a plurality of shaped fins radially extending from said axis of said vessel with each fin frictionally engaging said tube inner surface.

29. The reaction tube of claim 26 in which said extending member comprises at least one indentation formed in said inner surface of said tube.

30. The reaction tube of claim 26 in which said extending member comprises a single fin extending within said tube and frictionally engaging at opposing ends thereof said inner surface of said tube.

31. The reaction tube of claim 26 in which said extending member comprises at least one extension of said inner surface of said reaction tube.

32. The reaction tube of claim 26 in which there is provided containment means to confine said ferromagnetic member within a test volume.

References Cited
UNITED STATES PATENTS

| | | | |
|---|---|---|---|
| 3,053,078 | 9/1962 | Jewett | 73—54 |
| 3,492,096 | 1/1970 | Hattersley | 23—230 B |
| 3,520,659 | 7/1970 | Steinberg et al. | 23—230 B |

MORRIS O. WOLK, Primary Examiner

R. M. REESE, Assistant Examiner

U.S. Cl. X.R.

23—230 B, 253, 259; 73—64.1